(12) United States Patent
Bae et al.

(10) Patent No.: US 11,254,214 B2
(45) Date of Patent: Feb. 22, 2022

(54) VEHICLE AND METHOD OF CONTROLLING THE SAME

(71) Applicants: Hyundai Motor Company, Seoul (KR); Kia Motors Corporation, Seoul (KR)

(72) Inventors: JungHyeon Bae, Gyeonggi-do (KR); Jin Kim, Gyeonggi-do (KR); Young Il Lee, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/583,537

(22) Filed: Sep. 26, 2019

(65) Prior Publication Data

US 2020/0171955 A1 Jun. 4, 2020

(30) Foreign Application Priority Data

Nov. 29, 2018 (KR) .................... 10-2018-0150445

(51) Int. Cl.
*B60L 3/00* (2019.01)
*H02J 9/06* (2006.01)
*H02J 7/00* (2006.01)

(52) U.S. Cl.
CPC .......... *B60L 3/0069* (2013.01); *B60L 3/0038* (2013.01); *B60L 3/0046* (2013.01); *B60L 3/0084* (2013.01); *H02J 7/0068* (2013.01); *H02J 9/06* (2013.01)

(58) Field of Classification Search
None
See application file for complete search history.

(56) References Cited

U.S. PATENT DOCUMENTS

| 2010/0013308 A1* | 1/2010 | Lathrop | H02J 3/14 307/64 |
| 2012/0319469 A1* | 12/2012 | Krenz | H02J 4/00 307/9.1 |
| 2016/0059708 A1* | 3/2016 | Iwasaki | B60R 16/03 307/10.1 |

(Continued)

FOREIGN PATENT DOCUMENTS

| JP | 2011-166964 A | 8/2011 |
| JP | 2017-019382 A | 1/2017 |

(Continued)

*Primary Examiner* — Rexford N Barnie
*Assistant Examiner* — Terrence R Willoughby
(74) *Attorney, Agent, or Firm* — Mintz Levin Cohn Ferris Glovsky and Popeo, P.C.; Peter F. Corless

(57) ABSTRACT

A vehicle supplies stable and efficient power to a load of a vehicle during a failure or performance degradation of the vehicle by forming an isolated electrical network. The vehicle includes a power supply unit, an electrical network including at least one load configured to receive power from the power supply unit, and a sensor unit that acquires at least one of current flowing in a plurality of the electrical networks and a voltage supplied to the at least one load. A power distribution module determines an insolation required portion based on the current flowing in the electrical network and the voltage supplied to the at least one load, and connects or disconnects at least one point of the electrical network based on the isolation required portion to form an isolated electrical network.

6 Claims, 13 Drawing Sheets

(56) References Cited

U.S. PATENT DOCUMENTS

| | | | | |
|---|---|---|---|---|
| 2016/0059807 | A1* | 3/2016 | Iwasaki | B60R 16/03 |
| | | | | 307/10.1 |
| 2018/0198271 | A1* | 7/2018 | Morimoto | H02H 3/44 |
| 2019/0214844 | A1* | 7/2019 | Khafagy | H02H 3/087 |
| 2019/0326745 | A1* | 10/2019 | Kramer | H02H 1/0007 |
| 2019/0366956 | A1* | 12/2019 | Kim | B60W 10/30 |
| 2020/0014240 | A1* | 1/2020 | Boesch | B60R 16/03 |
| 2020/0136427 | A1* | 4/2020 | Heinrich | B60L 3/0046 |

FOREIGN PATENT DOCUMENTS

| | | |
|---|---|---|
| JP | 2017-024456 A | 2/2017 |
| JP | 2017-093235 A | 5/2017 |
| KR | 10-2017-0034021 A | 3/2017 |
| KR | 10-2017-0115647 A | 10/2017 |

\* cited by examiner

VEHICLE AND METHOD OF CONTROLLING THE SAME

CROSS-REFERENCE TO RELATED APPLICATION

This application is based on and claims priority under 35 U.S.C. § 119 to Korean Patent Application No. 10-2018-0150445, filed on Nov. 29, 2018, the disclosure of which is incorporated herein by reference.

BACKGROUND

1. Field of the Invention

The present invention relates to a technique for supplying stable electric power to components within a vehicle, and more particularly, to a method of supplying stable electric power to components within a vehicle during a failure or performance degradation of the vehicle.

2. Description of the Related Art

Vehicle power systems primarily include a power generation apparatus, a storage apparatus, and a plurality of centralized power distribution apparatuses. When the driver operates the vehicle normally with the driver's intention, and then the power system fails in a process of generating, storing, transferring, converting, and consuming power included in the power supply process of the vehicle, the failure may be promptly handled by intervention of the driver.

However, in an autonomous driving vehicle, the driver may have difficulty in intervening during the failure. Accordingly, there is a need for a power restoration function from the power system's perspective. However, since the power system structure currently has a difficulty in adopting failure detection, isolation, and recovery of the power system to perform the power restoration function, the autonomous driving vehicle requires a new power system structure.

Accordingly, there is a need for research regarding the vehicle grid that may ensure the safety of the driver by operating an auxiliary system in the event of a failure of the power system failure during autonomous driving.

SUMMARY

Therefore, it is an object of the present invention to provide a vehicle capable of supplying stable and efficient power to a load constituting a vehicle during a failure or a performance degradation of the vehicle by forming an isolated electrical network, and a method of controlling the same. Additional aspects of the invention will be set forth in part in the description which follows and, in part, will be obvious from the description, or may be learned by practice of the invention.

Therefore, an aspect of the present invention provides a vehicle that may include: a power supply unit; an electrical network including at least one load configured to receive power from the power supply unit; a sensor unit configured to acquire at least one of current flowing in a plurality of the electrical networks and a voltage supplied to the at least one load; and a power distribution module configured to determine an insolation required portion based on the current flowing in the electrical network and the voltage supplied to the at least one load, and connect or disconnect at least one point of the electrical network based on the isolation required portion to form an isolated electrical network.

The power distribution module may be configured to determine a faulty load among the at least one load based on the current flowing in the electrical network and the voltage supplied to the at least one load, and generate the isolated electrical network including the faulty load. The power distribution module may also be configured to determine a short circuit region or an open circuit region of the electrical network based on the current flowing in the electrical network, and form the isolated electrical network based on the short circuit region or the open circuit region.

Additionally, the power distribution module may be configured to determine a low voltage load based on the voltage supplied to the at least one load, and forms the isolated electrical network including the low voltage load. The power distribution module may further include a communication unit configured to receive a high power consumption signal from the at least one load, and form the isolated electrical network including the at least one load transmitting the high power consumption signal.

The vehicle may further include an auxiliary power supply unit configured to be charged by the power supply unit and supply power to the at least one load included in the isolated electrical network. The power supply unit may be configured to change the power to be output based on an amount of power requirement of the at least one load included in the isolated electrical network.

Another aspect of the present invention provides a method of controlling a vehicle that may include: acquiring at least one of current flowing in an electrical network and a voltage supplied to an at least one load; and determining an insolation required portion based on the current flowing in the electrical network and the voltage supplied to the at least one load; and connecting or disconnecting at least one point of the electrical network based on the isolation required portion to form an isolated electrical network.

The determining of the isolation required portion may include determining a faulty load among the at least one load based on the current flowing in the electrical network and the voltage supplied to the at least one load. In addition, the determining of the isolation required portion may include determining a short circuit region or an open circuit region of the electrical network based on the current flowing in the electrical network. The determining of the isolation required portion may include determining a low voltage load based on the voltage supplied to the at least one load.

The method may further include receiving a high power consumption signal from the at least one load, and the forming of the isolated electrical network may include forming the isolated electrical network including the at least one load transmitting the high power consumption signal. The method may further include supplying power to the at least one load included in the isolated electrical network and changing power to be output by a power supply unit based on an amount of power requirement of the at least one load included in the isolated electrical network.

BRIEF DESCRIPTION OF THE DRAWINGS

These and/or other aspects of the invention will become apparent and more readily appreciated from the following description of the exemplary embodiments, taken in conjunction with the accompanying drawings of which.

DETAILED DESCRIPTION

Figure 1:
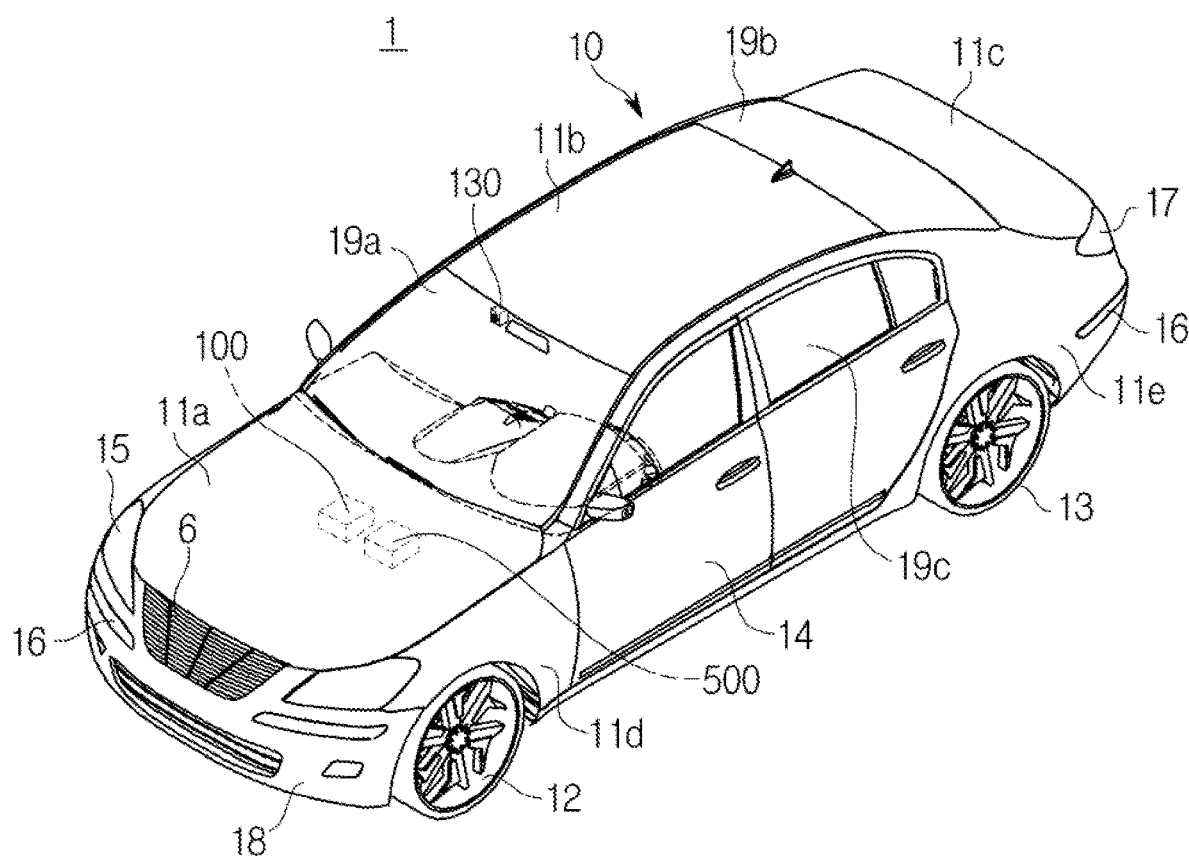
FIG. 1 is a view illustrating an external appearance according to an exemplary embodiment.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Like numerals refer to like elements throughout the specification. Not all elements of embodiments of the present invention will be described, and description of what are commonly known in the art or what overlap each other in the embodiments will be omitted. The terms as used throughout the specification, such as "~part", "~module", "~member", "~block", etc., may be implemented in software and/or hardware, and a plurality of "~parts", "~modules", "~members", or "~blocks" may be implemented in a single element, or a single "~part", "~module", "~member", or "~block" may include a plurality of elements.

It will be further understood that the term "connect" or its derivatives refer both to direct and indirect connection, and the indirect connection includes a connection over a wireless communication network. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof, unless the context clearly indicates otherwise.

Although the terms "first," "second," "A," "B," etc. may be used to describe various components, the terms do not limit the corresponding components, but are used only for the purpose of distinguishing one component from another component. As used herein, the singular forms "a," "an" and "the" are intended to include the plural forms as well, unless the context clearly indicates otherwise. Reference numerals used for method steps are just used for convenience of explanation, but not to limit an order of the steps. Thus, unless the context clearly dictates otherwise, the written order may be practiced otherwise.

Hereinafter, the principles and embodiments of the invention will be described with reference to the accompanying drawings.

FIG. 1 is a view illustrating an external appearance according to an exemplary embodiment. Referring to FIG. 1, a vehicle 1 may include a vehicle body 10 that forms the external appearance of the vehicle 1 and vehicle wheels 12 and 13 for moving the vehicle 1. The vehicle body 10 may include a hood 11a for protecting various apparatuses required for driving the vehicle 1, such as an engine, a roof panel 11b for forming the interior space of the vehicle 1, a trunk lid 11c provided with an accommodation space, and a front fender 11d and a quarter panel Ile disposed at a lateral side of the vehicle 1. In addition, the vehicle body 11 may include, at a lateral side thereof, a plurality of doors 15 hinged to the vehicle body 11.

A front window 19a may be disposed between the hood 11a and the roof panel 11b to provide a view of the front of the vehicle 1, and a rear window 19b may be disposed between the roof panel 11b and the trunk lid 11c to provide a view of the rear of the vehicle 1. In addition, the door 15 may be disposed at an upper side thereof with a side window 19c for providing a side view of the vehicle 1. In addition, the vehicle 1 may include, at a front side thereof, a headlamp 15 for illuminating in a driving direction of the vehicle 1.

In addition, the vehicle 1 may include, at the front side and the rear side thereof, a turn signal lamp 16 for indicating the turning direction of the vehicle 1. The vehicle 1 may indicate the turning direction by flickering the turn signal lamp 16. In addition, the vehicle 1 may include, at the rear side thereof, a tail lamp 17. The tail lamp 1 disposed at the rear side of the vehicle 1 may indicate a gear shift state of the vehicle 1, a brake operation state, and the like.

At least one vehicle controller 500 may be disposed within the vehicle 1. The vehicle controller 500 may be configured to perform an electronic control associated with the operation of the vehicle 1. Additionally, the vehicle 1 may include a power distribution device 100. The vehicle controller 500 may be installed at an arbitrary position within the vehicle 1 according to the selection of the designer. For example, the vehicle controller 500 may be installed between an engine room and a dashboard, or may be provided in a center fascia. The vehicle controller 500 may include at least one processor configured to receive an electrical signal, process the input electrical signal, and output the processed electrical signal. The at least one processor may be implemented using at least one semiconductor chip and associated components. The at least one semiconductor chip and the associated components are installed on a printed circuit board that may be installed inside the vehicle 1. In addition, the vehicle 1 may include a video camera 130 configured to acquire an image required for autonomous driving of the vehicle 1.

Figure 2:
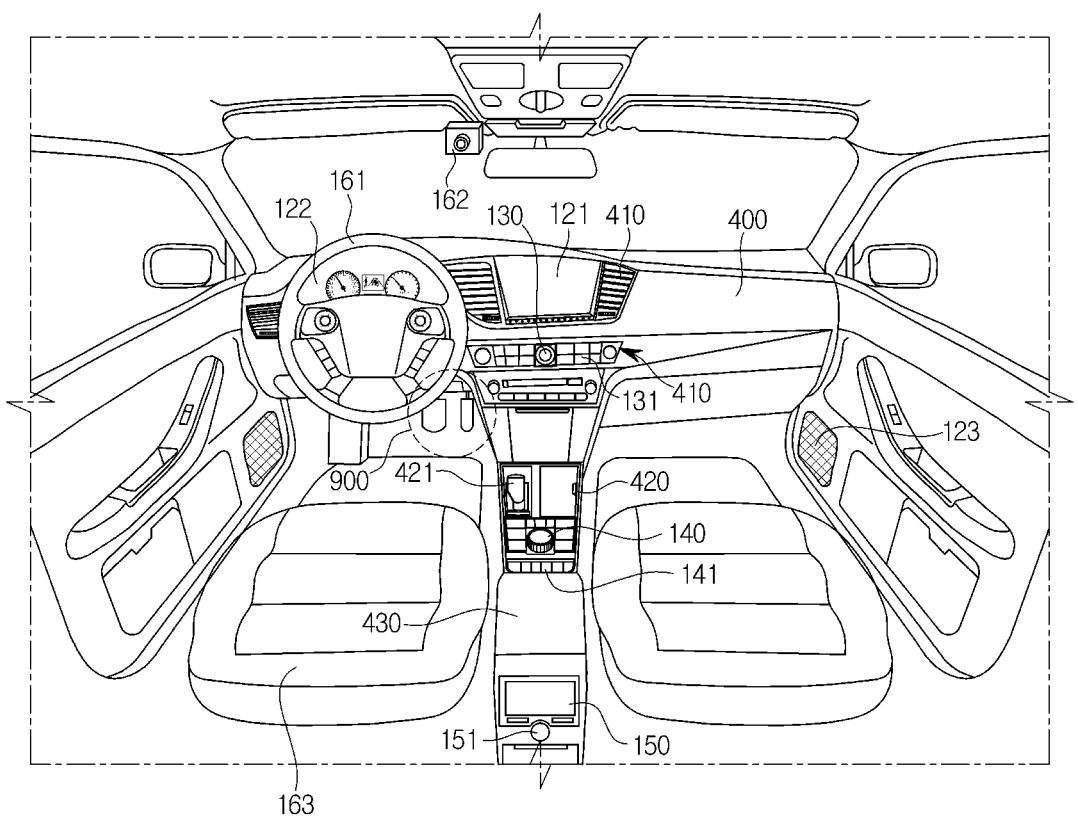
FIG. 2 is a view illustrating the interior of a vehicle according to an exemplary embodiment.

FIG. 2 is a view illustrating the interior of a vehicle according to an exemplary embodiment. Referring to FIG. 2, the vehicle 1 may include a dashboard 400, a center fascia 410 that extends from the dashboard 400, a gear box 420 installed at a lower end of the center fascia 410, and a console box 430 installed at a rear end of the gear box 420.

The dashboard 400 may divide the engine room 5 from the interior space of the vehicle 1, and may include a steering wheel 161, an instrument panel 122, an exhaust port 401, and the like installed thereto. The steering wheel 161 may be mounted adjacent to a driver's seat 163 on the dashboard 400. The steering wheel 161 may include a rim to be gripped by the driver and a spoke that connects the rim to a hub of a steering apparatus of the vehicle that is disposed on a rotational shaft for steering.

The driver may adjust the travel direction of the vehicle 1 by manipulating the rim to rotate the spoke to change the heading direction of the wheel. In addition, the spoke may include various input units for operating a radio apparatus, a vehicle communication apparatus, the instrument panel 122 and the like. In addition, the spoke include input units, such as a scroll wheel, a button, a knob, a touch screen, a touch pad, a lever, a trackball, a motion sensor, a voice recognition sensor, and the like.

The instrument panel 122 may be configured to display the travel speed, the engine revolutions per minute (RPM), the amount of fuel remaining, and the distance to empty of the vehicle 1. Generally, the instrument panel 122 may be mounted on the dashboard 400 behind the steering wheel 161. According to exemplary embodiments, the instrument panel 122 may be installed at other various locations on the dashboard 400 or may be installed at other various locations, such as on the center fascia 410. The exhaust port 410 may adjust the temperature in the vehicle body by discharging air of a particular temperature to the indoor space of the vehicle 1 according to the operation of an air conditioner. The exhaust port 401 may be installed at other various locations on the dashboard 400. For example, the exhaust port 401 may be installed on both sides of the display 121 as shown in FIG. 2.

The display 121 may be installed on an upper frame of the dashboard 400. The display 121 may be configured to output various images, such as a moving image and a still image, which are provided to a user. The display 121 may also be configured to display information required for driving as an image. For example, the display 121 may be configured to display a map of a surrounding area of the vehicle 1 or a travel path of the vehicle 1. The display 121 may be, for example, a navigation apparatus. The display 121 may include a display panel and an exterior housing for fixing the display panel. The exterior housing may be disposed at a lateral side or rear side with a fixing unit (not shown) for fixing the display panel to a predetermined position of the interior of the vehicle 1, for example, to the dashboard 400. When the display 121 is disposed at an upper end of the dashboard 400, the display 121 may be provided in various positions in the vehicle 1, to allow even passengers to view the contents of the screen.

The center fascia 410 may be disposed between the dashboard 400 and the gear box 420. The center fascia 410 may include at least one of a scroll wheel, a button, a knob, a touch screen, a touch pad, a lever, and a track ball for the user, such as a driver or a passenger, to input various commands for operating various functions of the vehicle 1. The center fascia 410 may include, at the lower end thereof, the gear box 420 in which a gear apparatus is installed. The gear box 420 may include a gear rod 421 for gear shift and an input unit for the driver to input various commands for operating various functions of the vehicle 1.

The console box 430 may be disposed at the rear end of the gear box 420. The console box 430 may include a predetermined space for storing various objects. In addition, a speaker 123 configured to output sound may be disposed within the vehicle 1. Accordingly, the vehicle 1 may be configured to output the sound required for performing an audio function, a video function, a navigation function, and other additional functions through the speaker 123. In addition to the speaker 123 that outputs sound to the inside of the vehicle 1, at least one speaker configured to output sound to the outside may be provided to output various types of sounds for a pedestrian or other vehicles' drivers to detect the vehicle 1.

Figure 3:
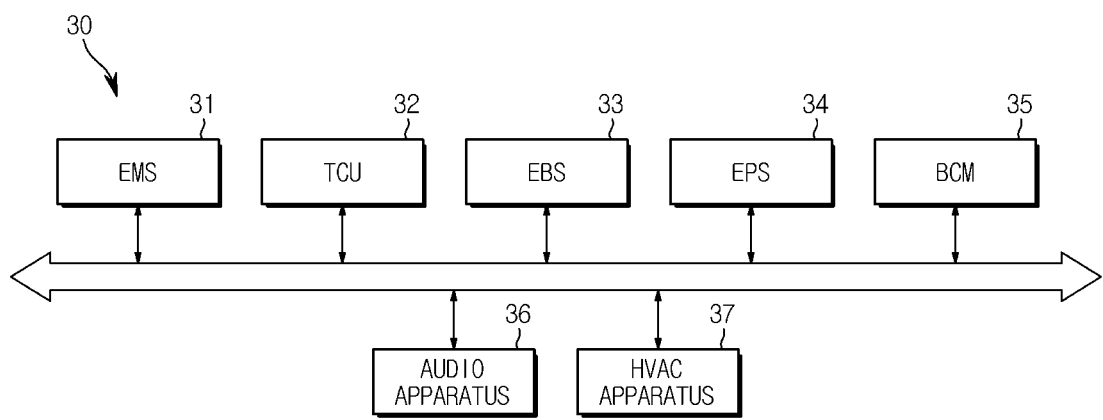
FIG. 3 is a view illustrating a load of a vehicle according to an exemplary embodiment.

FIG. 3 is a view illustrating a load of a vehicle according to an exemplary embodiment. Referring to FIG. 3, the vehicle 1 may include electronic components 30 including an engine management system (EMS) 31, a transmission control unit (TCU) 32, an electronic braking system (EBS) 33, an electric power steering (EPS) 34, a body control module (BCM) 35, an audio apparatus 36, a heating/ventilation/air conditioning (HVAC) apparatus 37, and a sensor unit and a power distribution apparatus 100 to be described below. In addition, an auxiliary power supply unit configured to supply electric power to the electric components 30 may be provided.

The EMS 31 may be configured to operate the engine and manage the engine in response to the driver's acceleration command through an accelerator pedal. For example, the EMS 31 may be configured to perform engine torque control, fuel efficiency control, engine failure diagnosis, and the like. The TCU 32 may be configured to operate the transmission in response to a shift command of the driver through a shift lever or a travel speed of the vehicle 1. For example, the TCU 32 may be configured to perform shift control, clutch control, and engine torque control during shifting. The EBS 33 may be configured to operate a braking apparatus of the vehicle 1 and maintain the balance of the vehicle 1 in response to the driver's braking command through a braking pedal. For example, the EBS 33 may include an anti-lock brake system (ABS), an electric stability control (ESC), and the like.

The EPS 34 may assist the driver to manipulate the steering wheel. For example, the EPS 34 may assist the user in performing a steering manipulation, such as decreasing the steering force at low-speed driving or parking, and increasing the steering force at high-speed driving. The BCM 35 may be configured to operate electric components that provide convenience to the driver or ensure the safety of the driver. For example, the BCM 35 may be configured to operate a door lock apparatus, a head lamp, a wiper, a power seat, a seat heater, a cluster, a room lamp, a navigation apparatus, and a multifunctional switch installed within the vehicle 1.

The auxiliary power supply unit may be configured to store electric energy generated from a rotational force of the engine and supply electric power to the various electric components 30 included within the vehicle 1. For example, while the vehicle 1 is being driven, an electric generator may be configured to convert rotational energy of the engine into electric energy, and the auxiliary power supply unit may be configured to receive the electric energy from the electric generator and store the received electric energy. In addition, the auxiliary power supply unit may be configured to supply power for starting the engine to a starter motor to drive the vehicle 1, or supply power to the electric components 30 of the vehicle 1 while the vehicle 1 is being driven, or supply power to the electric components 30 of the vehicle 1 during parking of the vehicle 1.

Additionally, the power distribution apparatus 100 may distribute the electric energy of the auxiliary power supply unit to each of the electric components 30 of the vehicle 1. In particular, the power distribution apparatus 100 may allow or block supply of electric energy to each of the electric components 30 from the auxiliary power supply unit. For example, the power distribution apparatus 100 may be configured to receive information regarding a driving state of the vehicle 1 from the EMS 31, the TCU 32, and the like, and receive information regarding a state of an electrical network from the sensor unit. In addition, the power distribution apparatus 100 may be configured to adjust the supply of electric energy to each of the electric components 30 based on driving information of the vehicle 1 and state information of the auxiliary power supply unit.

The vehicle 1 may further include electric components for protecting the driver and providing convenience to the driver. For example, the vehicle 1 may include electric components 30, such as a door locking apparatus, a headlamp, a wiper, a power seat, a seat heater, a cluster, a room lamp, a navigation apparatus, a multifunction switch, and the like. The electric components 30 may be configured to communicate with each other via vehicle communication network NT. For example, the electric components 30 may exchange data therebetween through Ethernet, media oriented systems transport (MOST), Flexray, controller area network (CAN) local interconnect network (LIN), and the like. The electric components 30 may be configured to receive power from the auxiliary power supply unit. As described above, the auxiliary power supply unit may be configured to supply power to the electric components 30 during travelling or parking of the vehicle 1.

Figure 4:
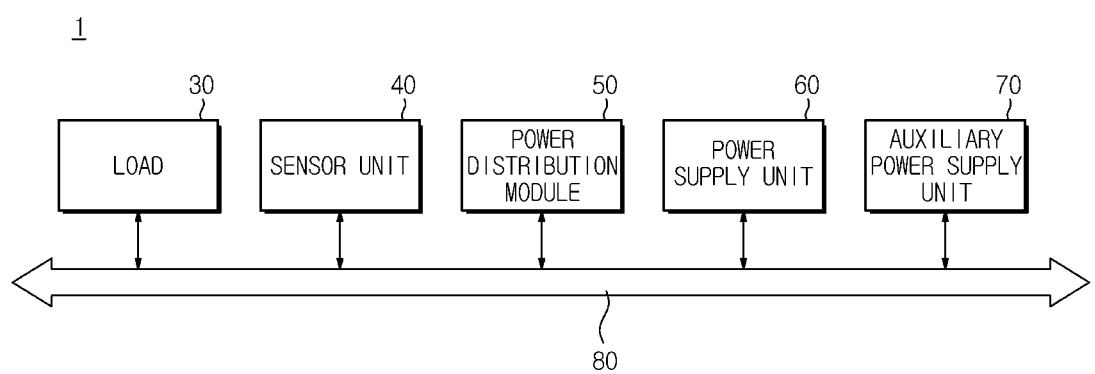
FIG. 4 is a control block diagram illustrating a vehicle according to an exemplary embodiment.

FIG. 4 is a control block diagram illustrating a vehicle according to an exemplary embodiment. Referring to FIG. 4, the vehicle may include a load 30, a sensor unit 40, a power distribution module 50, a power supply unit 60, and an auxiliary power supply unit 70 as described above that may be connected to each other via an electrical network 80. The power supply unit 60 may be implemented using an apparatus for supplying power of the vehicle while the vehicle is being driven. The power supply unit 60 may include an alternator A configured to convert the engine power into electric energy and an apparatus for starting the engine to drive the vehicle. In addition, the power supply unit 60 may include a generator (e.g., mild hybrid starter & generator: MHSG) and a converter. The power supply unit 60 may be configured to change the power to be output therefrom based on the amount of power requirement of at least one load 30 included in an isolated electrical network.

Meanwhile, the auxiliary power supply unit 70 may be configured to store the electric energy generated from the rotational force of the engine, and supply electric power to the various electric components 30 included within the vehicle 1. For example, during driving of the vehicle 1, the generator may be configured to convert the rotational energy of the engine into electric energy, and the auxiliary power supply unit 70 may be configured to receive the electric energy from the generator and store the received electric energy. The sensor unit 40 may be configured to obtain at least one of current flowing in the electrical network and a voltage supplied to the at least one load 30. The sensor unit 40 may include a current sensor configured to measure current. The current sensor may refer to a sensor configured to alternating current (AC) and direct current (DC).

Examples of a method of sensing current by a current sensor may include a transformer method in which a primary coil and a secondary coil are wound around a donut-shaped magnetic core and secondary current is measured such that primary current is detected, a hall element method in which a hall element is installed in a magnetic field that is generated by current and a hall voltage is measured such that the strength of the magnetic field, that is, the strength of the current is detected, and a fuse method in which the melting time varies with the amplitude of current.

Furthermore, the power distribution module 50 may be configured to determine an isolation required portion based on at least one of the current flowing in the electrical network and the voltage supplied to the at least one load 30 and connect or disconnect at least one point of the electrical network based on the isolation required portion, to thereby form an isolated electrical network. The isolation required portion involves a case in which isolation is required, including a case in which the load 30 included in the electrical network has a fault or failure, a case in which the power supply unit 60 outputs a low voltage, and a case in which some of the loads 30 require high power consumption. The isolated electrical network is an electrical network that is formed by connecting or disconnecting the electrical network using the power distribution module 50, and may be formed at a part of the entire electrical network.

In addition, the power distribution module 50 may be configured to determine a faulty load 30 among the at least one load 30 based on at least one of the current flowing in the electrical network and the voltage supplied to the at least one load 30, and form an isolated electrical network including the faulty load 30. The power distribution module 50 may form the isolated electrical network including the faulty load 30 to prevent the entire electrical network from being unstable due to the faulty load 30.

The power distribution module 50 may be configured to determine a short circuit region or an open circuit region of the electrical network based on the current flowing in the electrical network and may form the isolated electrical network based on the short circuit region or the open circuit region. When a part of the electrical network is short-circuited or open, excessive current flows, causing difficulty in supplying stable power. Accordingly, the power distribution module 50 may be configured to determine a short circuit point or an open circuit point as an isolation required portion and form an isolated electrical network including the short circuit network or open circuit network.

Examples of a method of sensing current by a current sensor may include a transformer method in which a primary coil and a secondary coil are wound around a donut-shaped magnetic core and secondary current is measured such that primary current is detected, a hall element method in which a hall element is installed in a magnetic field that is generated by current and a hall voltage is measured such that the strength of the magnetic field, that is, the strength of the current is detected, and a fuse method in which the melting time varies with the amplitude of current.

Further, the power distribution module 50 may be configured to determine a low voltage load 30 based on the voltage supplied to the at least one load 30, and form the isolated electrical network including the low voltage load 30. The power distribution module 50 may further include a communication unit configured to receive a high power consumption signal from the at least one load 30, and may form the isolated electrical network including the at least one load that transmits high power consumption information.

The communication unit included in the power distribution module 50 may be configured to transmit and receive data to and from various loads 30 within the vehicle 1 via the in-vehicle communication network. For example, the device may include a display, a TMU, an external amplifier, and a head unit, and also other devices mounted within the vehicle 1 without limitation. The communication unit may be configured to exchange data with the device in the vehicle 1 via CAN network.

The power distribution module 50 may include a memory (not shown) configured to store data regarding an algorithm for executing the operations of the components of the power distribution module 50 or a program that represents the algorithm, and a processor (not shown) that performs the above described operations using the data stored in the memory. In particular, the memory and the processor may be implemented as separate chips. Alternatively, the memory and the processor may be implemented as a single chip.

At least one component may be added or omitted to correspond to the performances of the components of the vehicle 100 shown in FIG. 4. In addition, the mutual positions of the components may be changed to correspond to the performance or structure of the system. Some of the components shown in FIG. 4 may refer to a software component and/or a hardware component, such as a Field Programmable Gate Array (FPGA) and an Application Specific Integrated Circuit (ASIC). Meanwhile, some of the components shown in FIG. 4 may refer to a software component and/or a hardware component, such as a Field Programmable Gate Array (FPGA) and an Application Specific Integrated Circuit (ASIC).

Figure 5A:
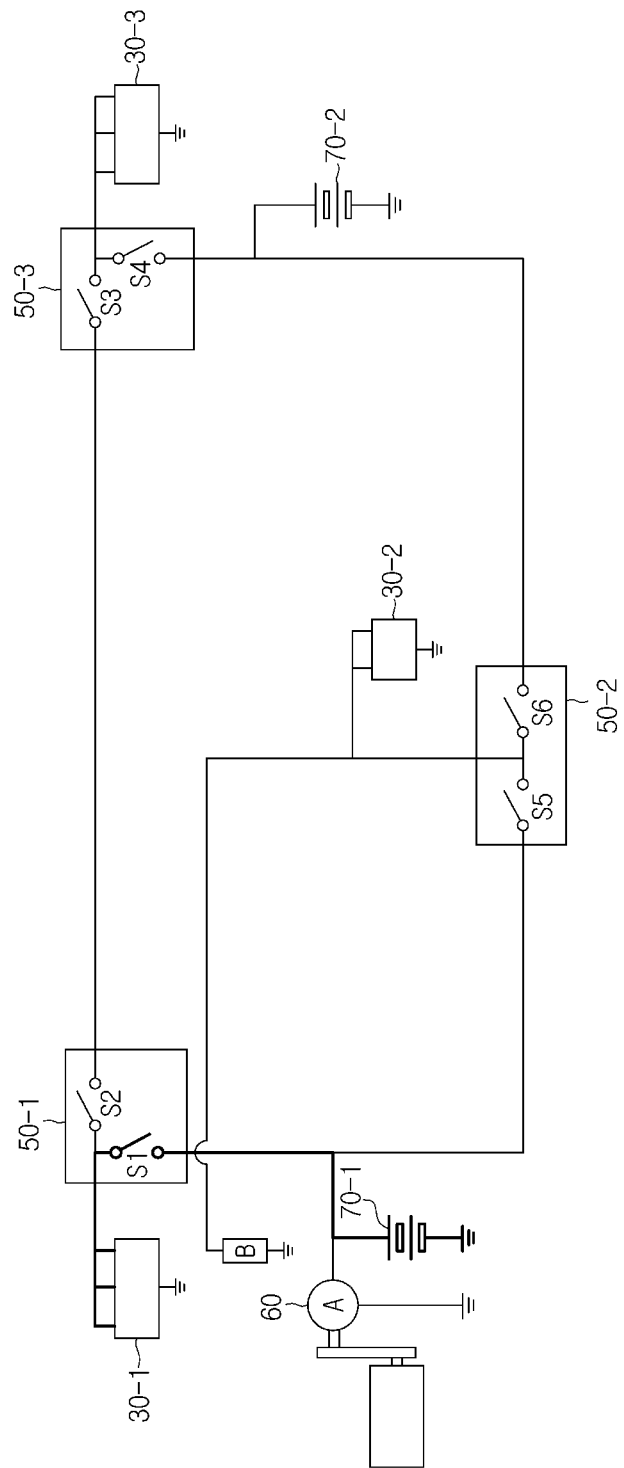
FIGS. 5A to 5C are diagrams illustrating isolated electrical networks according to an exemplary embodiment.
Figure 5B:
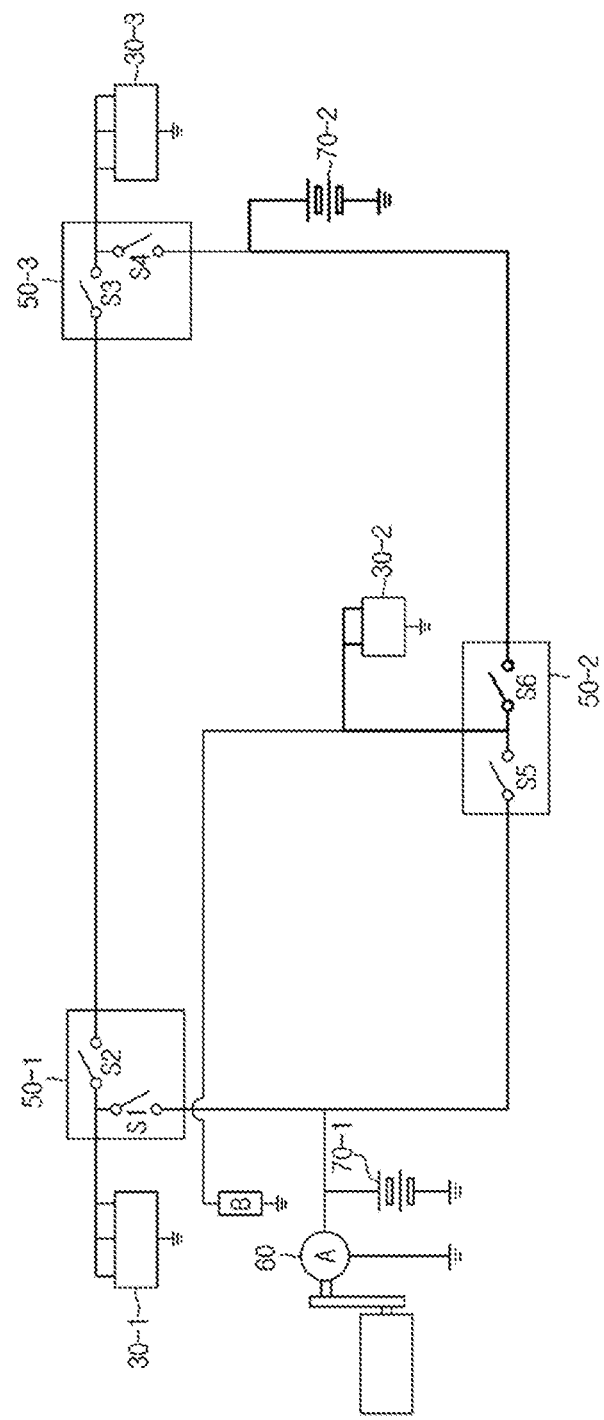
Figure 5C:
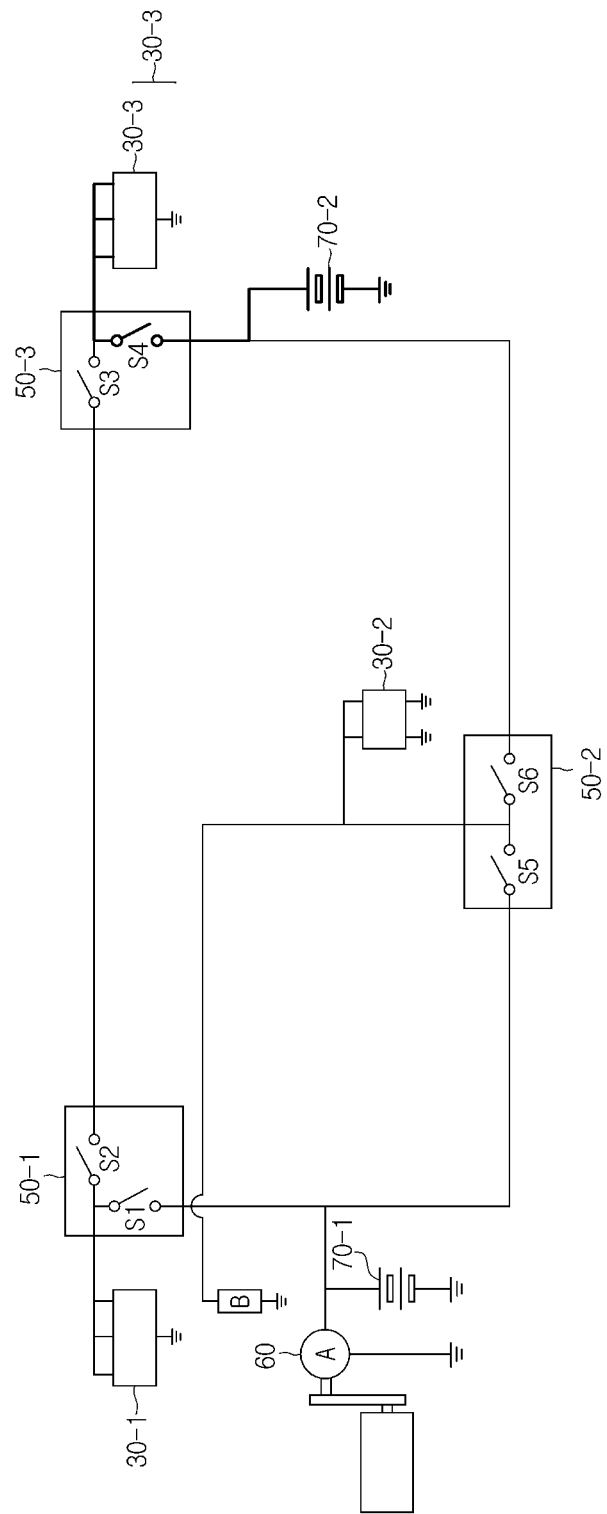

FIGS. 5A to 5C are diagrams illustrating isolated electrical networks according to an exemplary embodiment. FIGS. 5A to 5C illustrate formation of different isolated electrical networks. Referring to 5A, a power distribution module 50-1 may be configured to determine an isolation required portion based on a cause of a fault occurring in a first load 30-1, and connect a first switch 51 and open a second switch S2 to form an isolated electrical network. When the isolated electrical network is formed accordingly, the first load 30-1 may form the isolated electrical network supplied with power from a first auxiliary power supply unit 70-1.

Referring to 5B, a power distribution module 50-2 may be configured to determine an isolation required portion based on a cause of a fault occurring in a second load 30-2, and connect a sixth switch S6 and open a fifth switch S5 to form an isolated electrical network. When the isolated electrical network is formed accordingly, the second load 30-2 may form the isolated electrical network supplied with power from a second auxiliary power supply unit 70-2.

Referring to 5C, a power distribution module 50-3 may be configured to determine an isolation required portion based on a cause of a fault occurring in a third load 30-3, and connect a fourth switch S4 and open a third switch S3 to form an isolated electrical network. When the isolated electrical network is formed accordingly, the third load 30-3 may form the isolated electrical network supplied with power from the second auxiliary power supply unit 70-2.

Figure 6:
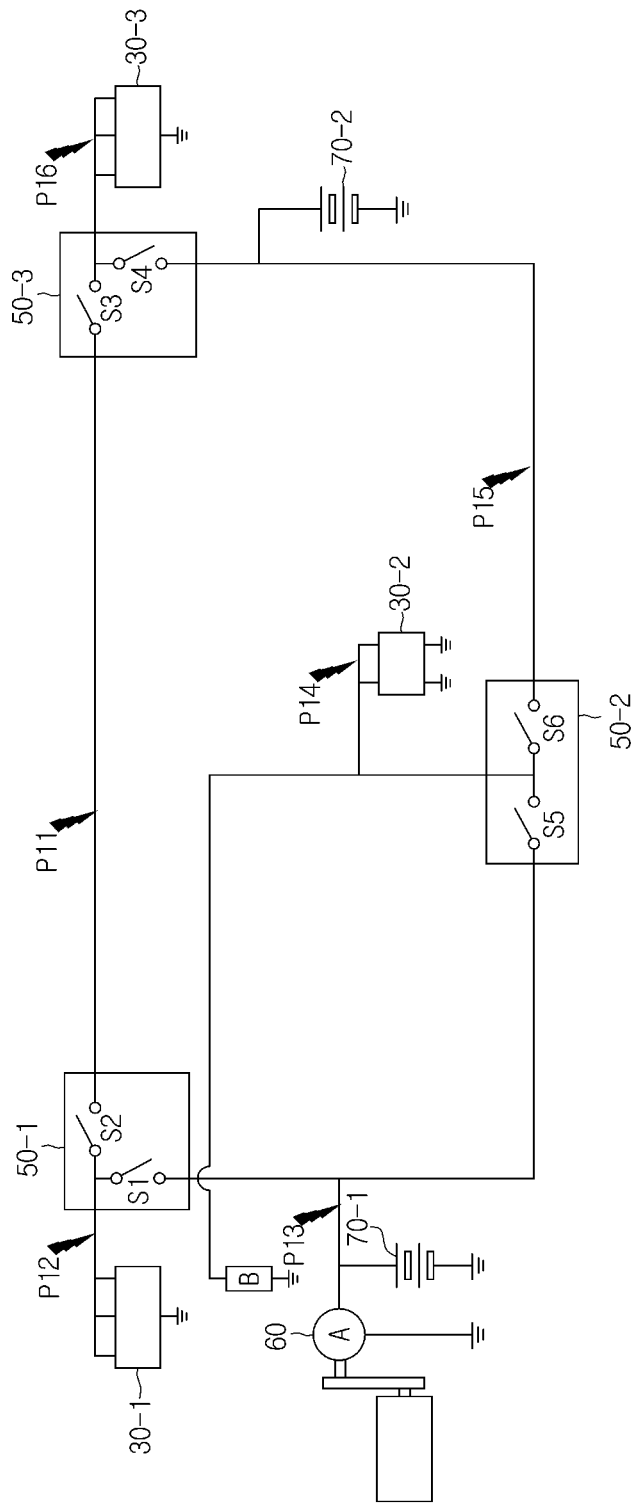
FIG. 6 is a diagram for describing an operation of forming an isolated electrical network including a faulty load according to an exemplary embodiment.

FIG. 6 is a diagram for describing an operation of forming an isolated electrical network including an isolation required portion according to an exemplary embodiment. FIG. 6 describes an operation of the electrical network when a fault or malfunction occurs in six points P11 to P16.

When a fault (e.g., failure, malfunction, etc.) occurs in the electrical network at a first point P11, an isolated electrical network including the first point P11 may be formed. The power distribution modules 50-1 and 50-2 may be configured to open the second switch S2 and the third switch S3 to form the isolated electrical network including the first point P11 to supply the entire network with stable power. When a fault occurs in the electrical network at a fifth point P15, an isolated electrical network including the fifth point P15 may be formed. The power distribution modules 50-2 and 50-3 may be configured to open the fourth switch S4 and the sixth switch S6 to form the isolated electrical network including the fifth point P15 to supply the entire electrical network with stable power.

Meanwhile, the fault described in FIG. 6 may include a power supply path loss, a short circuit or open circuit, a short circuit or open circuit of a battery, and a connector connection loss. Although the operation of forming the isolated electrical network has been described in relation to a designated portion in FIG. 6, the portion having a fault and the operation of forming the isolated electrical network according to the present invention are not limited thereto.

Figure 7:
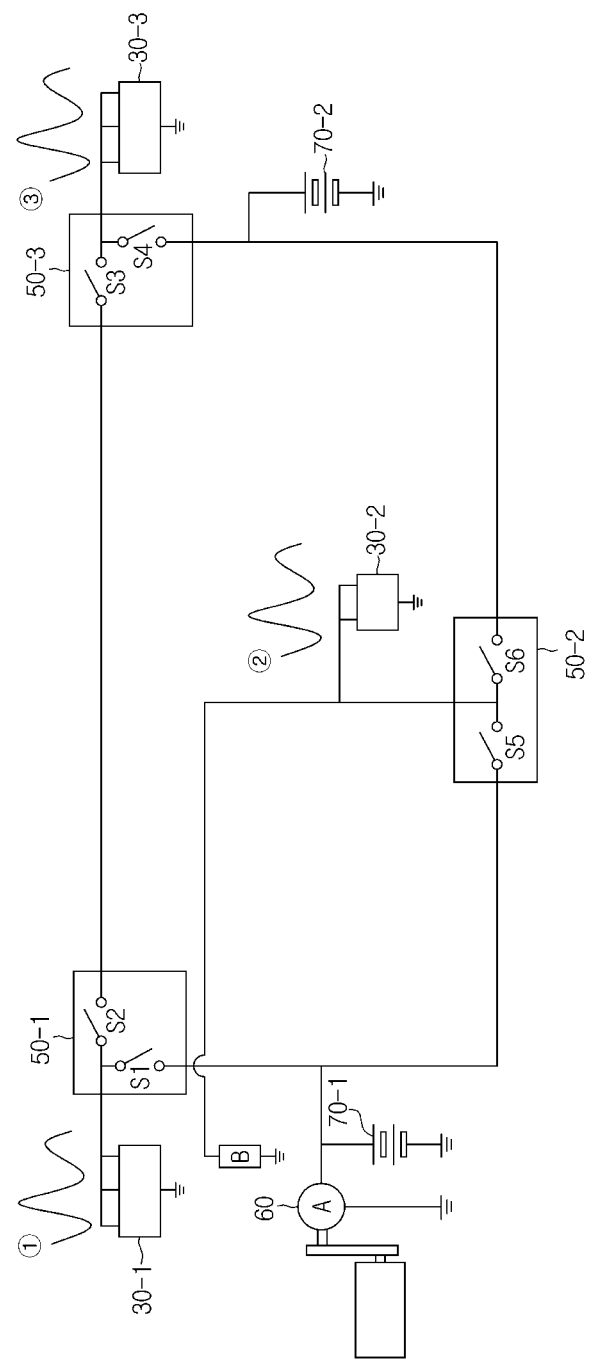
FIG. 7 is a diagram for describing an operation of forming an isolated electrical network including a low voltage load according to an exemplary embodiment.

FIG. 7 is a diagram for describing an operation of forming an isolated electrical network including a low voltage load according to an exemplary embodiment. FIG. 7 shows determining at least one of the first load 30-1, the second load 30-2, and the third load 30-3 to be a low-voltage load. A load in a low voltage state may represent a load in a condition having degraded power supply stability.

The power distribution modules 50-1, 50-2, and 50-3 may be configured to determine the first load 30-1 to be a low voltage load based on the information acquired by the sensor unit. The power distribution modules 50-1, 50-2 and 50-3 may form an isolated electrical network by opening the second switch S2, the third switch S3, and the fifth switch S5. On the contrary, the power distribution modules 50-1, 50-2, and 50-3 may be configured to determine the second load 30-2 to be a low voltage load based on the information acquired by the sensor unit. The power distribution modules 50-1, 50-2, and 50-3 may be configured to open the fourth switch S4 and the fifth switch S5 to form an isolated electrical network. In addition, the power distribution modules 50-1, 50-2, and 50-3 may be configured to determine the first load 30-1 to be a low voltage load based on the information acquired by the sensor unit. The power distribution modules 50-1, 50-2 and 50-3 may form an isolated electrical network by opening the second switch S2, the third switch S3, and the fifth switch S5.

The power distribution modules 50-1 and 50-3 may be configured to determine the first load 30-1 to be a low voltage load based on the information acquired by the sensor unit. The power distribution modules 50-1 and 50-3 may form an isolated electrical network by opening the second switch S2, the third switch S3, and the fifth switch S5. The cause of the low voltage load shown in FIG. 7 is not limited. Although the operation of forming the isolated electrical network has been described in relation to a designated low voltage load in FIG. 7, the portion having a fault and the operation of forming the isolated electrical network according to the present invention are not limited thereto.

Figure 8:
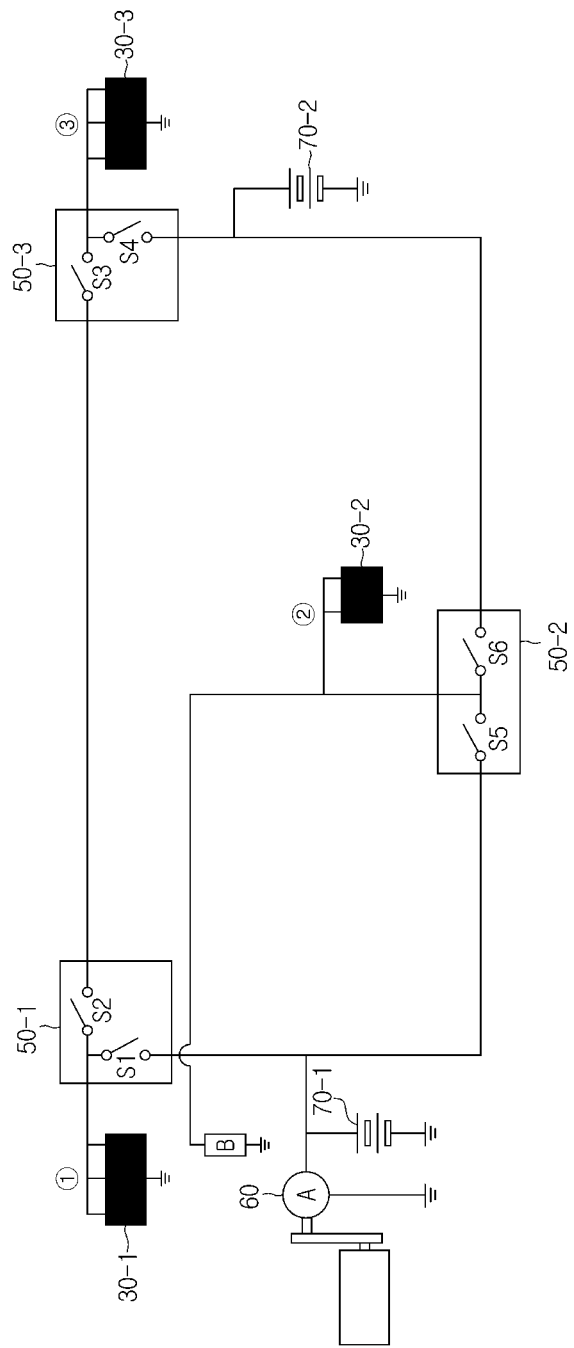
FIG. 8 is a diagram for describing an operation of forming an isolated electrical network including a high power consumption load according to an exemplary embodiment.

FIG. 8 is a diagram for describing an operation of forming an isolated electrical network including a high power consumption load according to an exemplary embodiment. FIG. 8 shows determining at least one of the first load 30-1, the second load 30-2, and the third load 30-3 to be a high power consumption load. A higher power consumption load represents a load in a condition consuming more power than normal times, and the high power consumption condition may include a restart, a heater-on situation in wintertime, a rapid steering, and a high speed turnaround. When a load consumes high power, the load may transmit a high power consumption signal, and the power distribution module may be configured to receive the high power consumption signal, determine the load to be a high power consumption load, and form an isolated electrical network including the load.

The power distribution modules 50-1, 50-2, and 50-3 may be configured to determine the first load 30-1 to be a high power consumption load based on the high power consumption signal transmitted by the load. The power distribution modules 50-1, 50-2 and 50-3 may form an isolated electrical network by opening the second switch S2, the third switch S3, and the fifth switch S5. The power distribution modules 50-1, 50-2, and 50-3 may be configured to determine the second load 30-2 to be a high power consumption load based on the high power consumption signal transmitted by the load, and may form an isolated electrical network by opening the fourth switch S4 and the fifth switch S5.

The power distribution modules 50-1, 50-2, and 50-3 may be configured to determine the third load 30-3 to be a high power consumption load based on the high power consumption signal transmitted by the load, and may form an isolated electrical network by opening the third switch S3 and the sixth switch S6. Meanwhile, the cause of the high power consumption shown in FIG. 8 is not limited. Although the operation of forming the isolated electrical network has been described in relation to a designated high power consumption load in FIG. 8, the portion having a fault and the operation of forming the isolated electrical network according to the present invention are not limited thereto.

Figure 9:
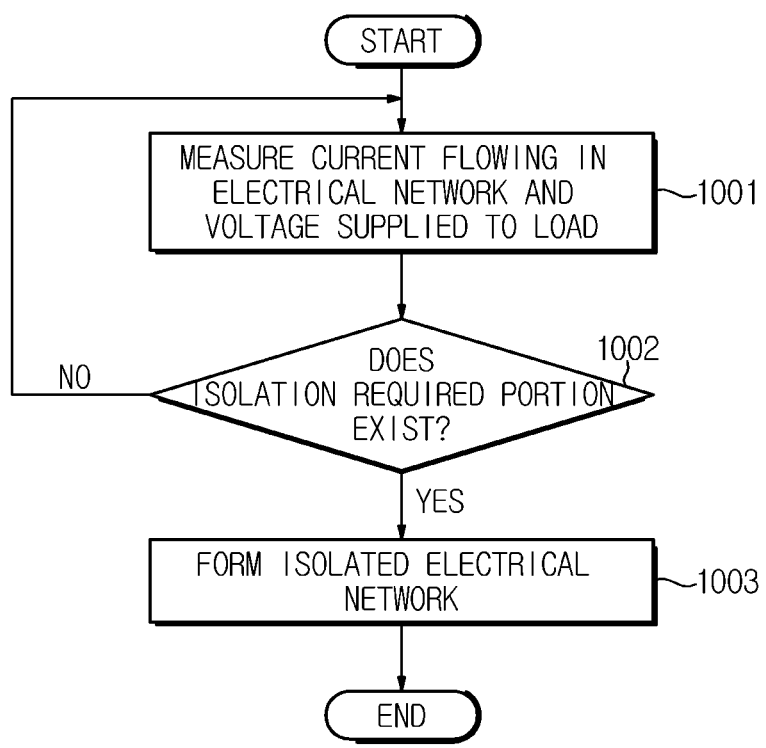
FIGS. 9 to 11 are flowcharts according to exemplary embodiments.
Figure 10:
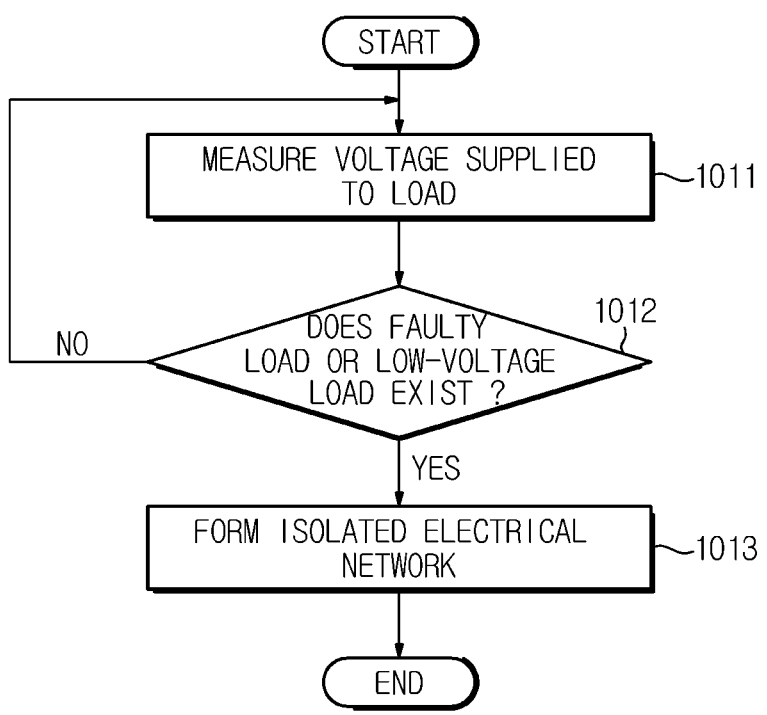
Figure 11:
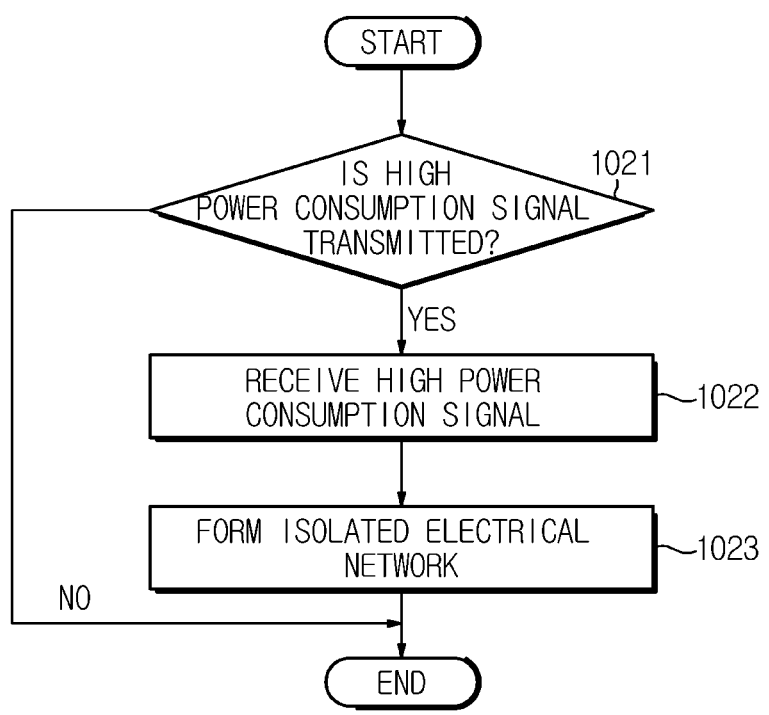

FIGS. 9 to 11 are flowcharts according to exemplary embodiments. Referring to FIG. 9, the sensor unit provided in the electrical network may be configured to measure current flowing in the electrical network and a voltage supplied to the load (1001). When an isolation required portion exists in the electrical network, such as a faulty load (1002), the power distribution apparatus may form an isolated electrical network (1003).

Referring to FIG. 10, the sensor unit may be configured to acquire the supply voltage of the load (1011). The power distribution apparatus may be configured to determine whether a faulty load or a load supplied with a low voltage exists in the electrical network based on the voltage acquired by the sensor unit (1012). The power distribution apparatus may form an isolated electrical network including a faulty load or a low voltage load (1013).

Referring to FIG. 11, at least one load may transmit a high power consumption signal (1021). The power distribution module may be configured to receive a high power consumption signal transmitted by the load (1022), and determine a high power consumption load based on the received high power consumption signal, and form an isolated electrical network (1023).

Meanwhile, the disclosed exemplary embodiments may be embodied in the form of a recording medium storing instructions executable by a computer. The instructions may be stored in the form of program code and, when executed by a processor, may generate a program module to perform the operations of the disclosed embodiments. The recording medium may be embodied as a non-transitory computer-readable recording medium.

The non-transitory computer-readable recording medium includes all types of recording media in which instructions which can be decoded by a computer are stored, for example, a Read Only Memory (ROM), a Random Access Memory (RAM), a magnetic tape, a magnetic disk, a flash memory, an optical data storage device, and the like.

As is apparent from the above, the vehicle according to the exemplary embodiment and the method of controlling the same may supply stable and efficient power to a load constituting a vehicle in the event of a failure or a performance degradation of the vehicle by forming an isolated electrical network.

Although exemplary embodiments of the present invention have been described for illustrative purposes, those skilled in the art will appreciate that various modifications, additions and substitutions are possible, without departing from the scope and spirit of the invention. Therefore, exemplary embodiments of the present invention have not been described for limiting purposes.

What is claimed is:

1. A vehicle, comprising:
a first power distribution module connected to a first load and including a first switch and a second switch;
a second power distribution module connected to a second load and including a third switch and a fourth switch;
a third power distribution module connected to a third load and including a fifth switch and a sixth switch, wherein the sixth switch is connected to the fourth switch, the fifth switch is connected to the second switch, and the first switch is connected to the third switch;
a first power supply unit connected to the first power distribution module and the second power distribution module;
a second power supply unit connected to the second power distribution module and the third power distribution module;
an electrical network including the first load, the second load, and third load configured to receive power from at least one of a first auxiliary power supply unit and a second auxiliary power supply unit;
a sensor unit configured to acquire a current flowing in the electrical network and a voltage supplied to the first load, the second load, and the third load, respectively;
a power distribution module configured to determine an insolation required portion based on the current and the voltage supplied to the first load, the second load, and the third load, respectively acquired by the sensor unit, and disconnect at least two points of the electrical network, turning off at least two of the first switch, the second switch, the third switch, the fourth switch, the fifth switch, and the sixth switch based on an isolation required portion,
wherein the at least two point of the electrical network are separated from the electrical network to form an isolated electrical network,
wherein the isolation required portion includes at least one of a state in which at least one of the first load, the second load, and the third load is a fault or fail, a state in which a low voltage is output from at least one of the first and second power supply units, and a state that requires high power consumption in the at least one of the first load, the second load, and the third load.

2. The vehicle of claim 1, wherein the power distribution module is configured to determine a fault of the at least one of the first load, the second load, and the third load, based on the acquired current and the voltage supplied to the first load, the second load, and the third load, respectively, and wherein the isolated electrical network includes a load determined to be faulty.

3. The vehicle of claim 2, wherein at least one of the first power supply unit and the second power supply unit change a power to be output based on an amount of power requirement of the load included in the isolated electrical network.

4. The vehicle of claim 1, wherein the power distribution module is configured to determine a low voltage of the first load, the second load, and the third load, respectively based on the voltage supplied to the first load, the second load, and the third load, respectively.

5. The vehicle of claim 1, wherein the power distribution module further includes:
   a communication unit configured to receive a high power consumption signal from the at least one of the first load, the second load, and the third load.

6. The vehicle of claim 1, wherein the first power supply unit and the second power supply unit perform charging by other power supply.

* * * * *